United States Patent [19]

Flippin

[11] 4,197,918
[45] Apr. 15, 1980

[54] SUBTERRANEAN PLOW BLADE

[75] Inventor: James S. Flippin, Clearwater, Kans.

[73] Assignee: J. I. Case Company, Racine, Wis.

[21] Appl. No.: 914,884

[22] Filed: Jun. 12, 1978

[51] Int. Cl.² .............................................. A01B 35/26
[52] U.S. Cl. .................................... 172/699; 172/749;
172/763; 403/399
[58] Field of Search ................. 172/749, 40, 753, 763,
172/699, 777, 778, 713, 719; 403/398, 399

[56] References Cited

U.S. PATENT DOCUMENTS

| | | | |
|---|---|---|---|
| 2,684,617 | 7/1954 | Johnston | 172/699 |
| 2,912,774 | 11/1959 | McCrary | 172/777 |
| 2,931,446 | 4/1960 | Gwinn | 172/699 X |
| 3,006,089 | 10/1961 | Johnson | 172/699 X |
| 3,016,253 | 1/1962 | Launder | 403/398 |
| 3,196,956 | 7/1965 | Ratkowski | 172/699 X |
| 4,136,983 | 1/1979 | Dobberpuhl | 172/43 |

FOREIGN PATENT DOCUMENTS 2365914 12/1976 Fed. Rep. of Germany .......... 172/753
521724 3/1955 Italy ........................................ 403/399

Primary Examiner—Richard J. Johnson
Attorney, Agent, or Firm—Arthur J. Hansmann

[57] ABSTRACT

A subterranean plow blade for mounting onto a tractor in a clamping fashion for fast and easy mounting and removal. A blade holder is affixed to a tractor, and clamp pieces are pivotly mounted on the holder with one piece thereof engaging the blade and the other pieces forcing the first one piece tightly against the blade for holding same. The holding pieces are adjustably interrelated to accommodate variations in piece and blade sizes. The blade is arranged with a leading edge which penetrates the ground and has its intermediate portion sharpened while the portion above and below that intermediate sharpened portion is blunt or unsharpened, all for maximum functioning in moving through the ground. Also, the blade has notches on its leading and trailing edges for the ready mounting with the blade holder.

6 Claims, 6 Drawing Figures

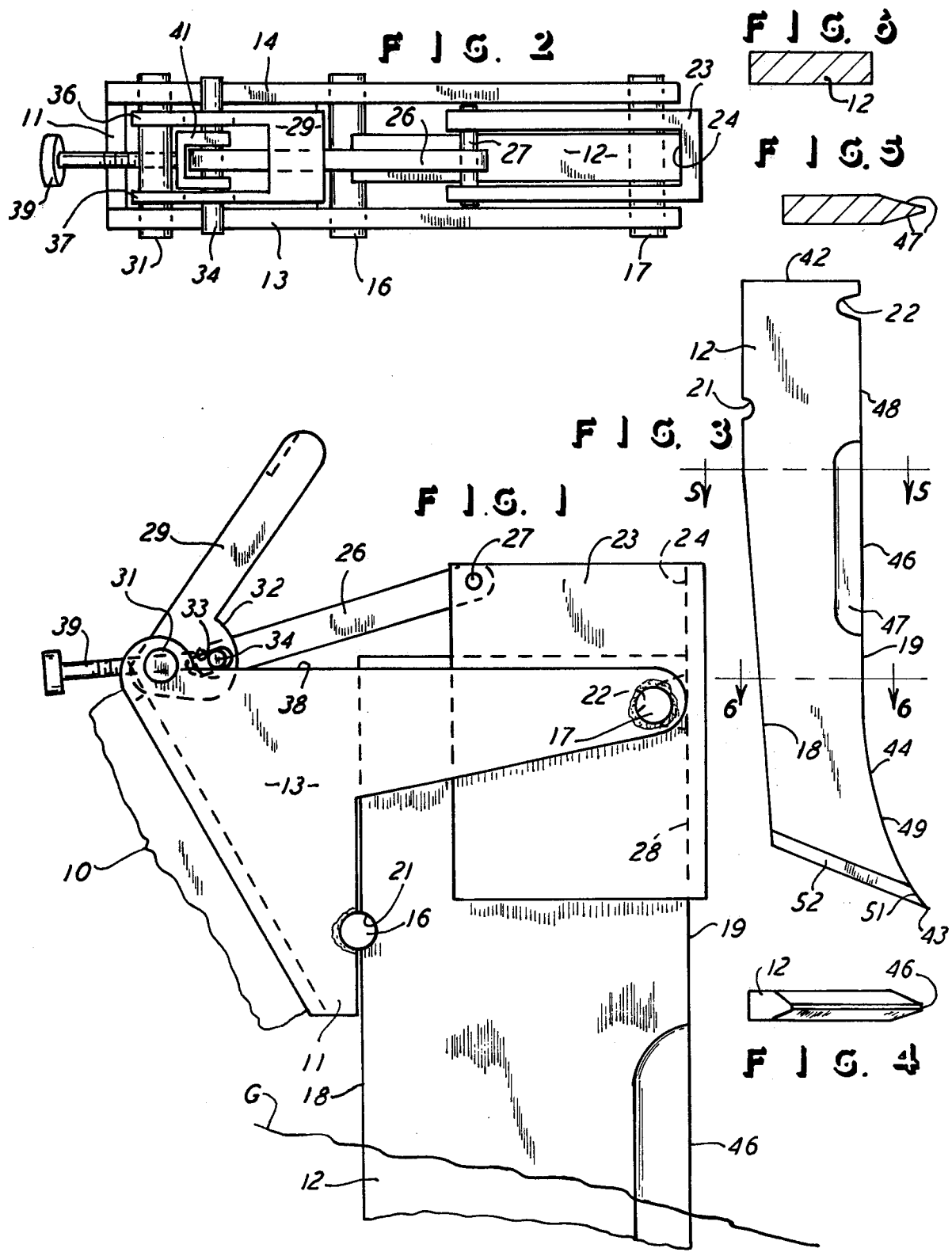

4,197,918

SUBTERRANEAN PLOW BLADE

This invention relates to a subterranean plow blade, and, more particularly, it relates to a plow blade of the nature which penetrates the ground and forms a slit or kerf therein for laying cable below the ground surface.

BACKGROUND OF THE INVENTION

One skilled in the art of subterranean plow blades, or the plow blade for laying cable beneath the surface, is already aware of the variety of configurations and multiple pieces utilized for providing the plow blade itself. That is, the configurations are complex and virtually unlimited in their variety, and the blades are also made of two or more pieces. Therefore, the prior art blades are complex and difficult to manufacture and maintain and are inefficient in their use, and they require the manufacture and assembly of two or more parts, at least in those types of blades. U.S. patents which generally show plow blades having sharpened edges extending along the leading edge and to the very lower tip thereof, and which show various means for assembling or mounting the blade relative to a tractor, are U.S. Pat. Nos. 3,363,423 and 3,390,533 and 3,744,260 and 3,851,489.

U.S. patents which generally show plow blades having irregular and complex sharpened leading edges and some of which show the blade made in two or more pieces are U.S. Pat. Nos. 2,632,265 and 2,925,872 and 3,066,491 and 3,326,009 and 3,341,253 and 3,405,533 and 3,486,344 and 3,497,016 and 3,575,006. Also, all of the aforesaid patents show various means for assembling and securing a blade with a tractor unit or the like.

The present invention provides a subterranean plow blade apparatus which is readily and easily manufactured in that it is a one piece blade and is sharpened along a straight line on its leading edge, and arrangement is made for ready and easily assembly and disassembly with a tractor unit. That is, the blade of this invention can be readily clamped to a tractor and it can be readily released therefrom, and no special alignment holes or bolting or the like is required.

In addition to providing a plow blade which can be readily and easily attached and removed from a tractor, the present invention provides a blade which reduces friction with the soil and which increases soil fracture. In accomplishing these objectives, the plow blade of this invention is made with only the intermediate length of its leading portion sharpened, and thus the unsharpened or square edge presents a smaller surface to the effects of friction and it eliminates the wedging effect of a sharpened edge. The soil in front of the blade is fractured to a greater extent by the square edge when the shaker box pulls the blade upward in the soil. The loosened soil flows upward along the leading edge and is relieved by the short sharpened section which terminates slightly below ground level. This sharpened portion reduces heaving at the soil surface.

These and other objects and advantages will become apparent upon reading the following description in light of the accompanying drawing.

BRIEF DESCRIPTION OF THE DRAWING

FIG. 1 is a side elevational view showing the blade and assembly of this invention.

FIG. 2 is a top plan view of FIG. 1.

FIG. 3 is a side elevational view of the blade of this invention.

FIG. 4 is a bottom plan view of FIG. 3.

FIGS. 5 and 6 are sectional views taken on the lines 5—5 and 6—6, respectively, of FIG. 3.

DETAILED DESCRIPTION OF THE PREFERRED EMBODIMENT

The drawings show the structure of this invention, and it will be understood, by one skilled in the art, that the arrangement and structure are in the nature of that shown in the aforesaid patents, such as U.S. Pat. No. 3,363,423 in that there is a tractor which supports the blade and moves the blade forwardly through the ground so that the blade can form its slit in the ground and so that the underground cable can be laid behind the path of the blade. Thus, a tractor fragment 10 is shown and it supports a member 11 affixed thereto and which in turn holds the plow blade 12. Therefore, the tractor 10 would move toward the right, as viewed in the drawings, and the blade 12 would be supported thereon so that the lower end of the blade is in a forward position relative to the remainder of the blade. That is, the blade is preferrably supported to have its leading edge at an angle relative to the vertical direction, such as shown in the aforesaid patents, and specific reference is made to U.S. Pat. No. 3,575,006. For convenience and clarity of drawing, the drawings show the blade 12 in a vertical position rather than the preferred operative position where the blade is angled, as described above.

The member 11 includes two side portions 13 and 14 which extend along opposite sides of the plow blade 12, and the member 11 also includes two cross pins or rods 16 and 17 affixed to the member 11 to extend between the opposite portions 13 and 14, as shown. The rods 16 and 17 are shown to be cylindrical, and they contact the plow blade trailing edge 18 and leading edge 19, respectively, with respect to the direction of operation of the blade, namely, to the right as viewed in the drawings. At this time it will also be noted that the blade 12 has notches 21 and 22 on the trailing and leading edges 18 and 19, respectively, and those notches receive the cross pins 16 and 17 for holding the blade 12 relative to the member 11. The notch 22 is V-shaped and extends into the blade from the leading edge 19 a distance substantially greater than the thickness or diameter of the pin 17 so that the pin 17 is fully nested or received within the notch 22. However, the notch 21 is only semicircular in the blade trailing edge 18, and thus only one half of the corresponding portion of the pin 16 is received in the notch 21.

Thus, the member 11 is C-shaped and extends around the upper end of the blade 12 for holding the blade, as shown.

Another C-shaped member 23 exends around at least a portion of the upper end of the blade 12 and is pivotly mounted on the pin 17 of the member 11 and presents a surface 24 to the blade leading edge 19. A link 26 is pivotly connected with the member 23 through a pn 27, and, as hereinafter described, the link 26 pivots the member 23 about the pin 22 to cause the lower end 28 of the surface 24 to bear against the blade leading edge 19. The blade 12 is thus confined by the pins 21 and 22 and the lower end 28 of the surface 24.

A handle 29 is pivotly mounted on a pin 31 supported on the member 11, and the handle has an offset proportion 32 which contains a slot 33 for receiving a pivot pin 34. The pin 34 is fixedly connected with the link 26 and extends into the slot 33 to thus swing the pin 34 about the axis of the pin 31 when the handle 29 is pivotted up and down and thus about the pin 31. In that manner, the link 26 is displaced to move essentially toward and away from the member 23 and thus cause the member 23 to clamp relative to the blade 12, as described above.

FIG. 2 shows that the handle 29 has two legs 36 and 37 which extend on opposite sides of the link 26 for urging on the pin 34 and thus displacing the link 26, as mentioned.

As shown in FIG. 1, it will be seen that the pin 34 is in a downward and over-center position relative to a straight line between the axes of the pins 31 and 27, and thus the link 34 is in a stable and set condition, and therefore the blade 12 is securely retained in the FIG. 1 position. The opposite ends of the pin 34 rest downwardly on or abutt the upper edges 38 of the portions 13 and 14 of the member 11, and thus there is a stop relative to the clamping or downward locking position for the handle 29 and the link 26, all to assure that the over-center positon is achieved and secure.

Of course to release the blade 12, the handle 29 is swung upwardly or in the counterclockwise direction about the pin 31 and therefore the link 26 is moved leftwardly and the member 23 is thus freed from the blade 12 which can then be tipped and maneuvered free of the pins 16 and 17. In that context, the pin 16 is only a pilot type of pin, and it could be eliminated and thus have the edge 18 bear directly against the body of the member 11. The pin 17 is nested in the deep notch 22, so the blade 12 can not move, and the member 23 will complete the clamping and securing of the blade 12 in the blade holder described herein.

A threaded member 39 is threadedly engaged with and extends through the pin 31 and connects with a bifurcation member 41 which is affixed with the pin 34. Thus, the positioning of the pin 34 in the adjustment slot 33 is made possible, and thus the pivot point of the link 26 relative to the handle 29 is adjustable, all according to the threaded positioning of the member 39 and consequently the pin 34 relative to the pivot axis of the pin 31. That arrangement provides for the desired over-center clamping and also allows for variations in sizes and fittings between the pieces involved.

The drawings also show that the blade 12 is of a generally uniform shape which is elongated from its upper edge 42 down to its lower tip 43. Thus, the views FIGS. 4, 5, and 6 show that the blade is of a rectangular cross section and made from a flat bar stock, and there is a slight angle along the lower end of the blade trailing edge 18, as seen in FIG. 3, and there is a curvature along the lower end 44 of the blade leading edge 19, and that curvature is of course actually concaved with respect to the direction of forward movement of the blade through the ground. FIG. 3 further shows that the leading edge 19 lies on a straight line, except for the lower end 44 which lies on a curved line. FIG. 3 further shows that the blade intermediate portion 46 is sharpened to present a sharpened leading edge 47, and the blade intermediate portion sides form a wedge shape, as seen in FIGS. 4 and 5. However, the length 48 of the blade leading edge 19 above the sharpened portion 46, and the portion 49 of the blade leading edge 19 below the sharpened portion 46 are both shown to be unsharpened or blunt, as indicated in the section view FIG. 6. Finally, the very lower end 51 of the blade leading edge 19 is also sharpened, as shown in FIGS. 3 and 4, and the lower edge 52 of the blade 12 is also sharpened.

FIG. 1 indicates the ground line G, and thus the angle of the blade 12 with respect to the level ground G. Further, it will be seen that the sharpened edge 46 extends slightly below the ground line G and terminates slightly therebelow. With that arrangement, the operative upper end of the blade 12 is defined by the sharpened portion or edge 46, and the leading edge portion 44, which extends from the sharpened portion 46 and to the sharpened lower edge 51, is a blunt or unsharpened portion which fractures the ground with a minimum of frictional resistance. Further, the soil in front of that unsharpened portion is fractured to a greater extent than would be produced by a sharpened or wedge-shaped portion. Still further, when the blade is pulled upward into the soil in its operation, the loosened soil flows upward along the leading edge 19 and is relieved by the sharpened portion 46 which therefore reduces the heaving at the surface or ground line G. Therefore, the blade 12 results in reduced friction and increased soil fracture and less build up of debris at the ground line, such as grass debris and the like and the soil brought to the ground line G is not piled but is leveled off, by virtue of the sharpened edge 46.

What is claimed is:

1. A plow blade assembly comprising a blade having a leading edge and a trailing edge for movement through the ground, a blade holder including pivotly connected pieces for releasably securing said blade to said holder, a first one of said pieces extending around said blade and into contact with said edges of said blade, a second one of said pieces being pivotly connected with said first one of said pieces and extending into contact with said blade, a third one of said pieces pivotly connected between said first one and said second one of said pieces, the location of the contact between said second one of said pieces and said blade and the location of said pivot connection between said third one and said first one of said pieces being on opposite sides of the pivot connection between said first one and said second one of said pieces, and a lever attached to said third one of said pieces for forcing on said third one of said pieces and thereby force said first one and said second one of said pieces into clamp relation with said blade.

2. The plow blade assembly as claimed in claim 1, wherein said first one of said pieces and said blade have intermated configurations for joining them together.

3. The plow blade assembly as claimed in claim 1, including an adjustable member interconnecting said second one of said pieces and said third one of said pieces for altering the effective length of said third one of said pieces.

4. A plow blade assembly as claimed in claim 1, wherein said blade has a notch on each of said edges thereof, and projections on said first one of said pieces and nested in said notches for holding said blade with said first one of said pieces.

5. A plow blade assembly comprising a blade having a leading edge and a trailing edge for movement through the ground, a first member having two portions which are respectively extending into contact with said edges of said blade, a second member pivotly connected with said first member and extending into contact with one of said blade edges, a clamp movably connected between said members and having a lever handle for actuating said clamp and moving said second member into snug contact with said blade, said clamp including a link pivotly connected between said handle and said second member for moving said second member into snug contact with said blade.

6. The plow blade assembly as claimed in claim 5, wherein said blade has a notch on each of said edges thereof, and said portions on said first member nested in said notches for holding said blade with said first member.

* * * * *